Dec. 7, 1926.  
E. M. FRANZEN  
TRAILER CONNECTION  
Filed Nov. 29, 1924  
1,610,083
2 Sheets-Sheet 2
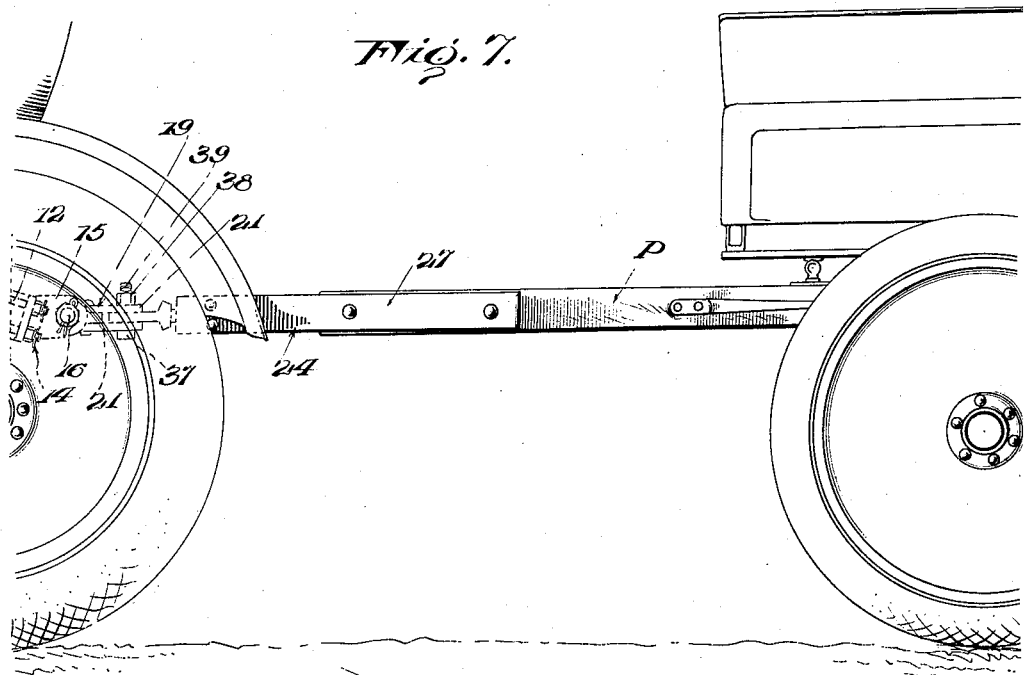
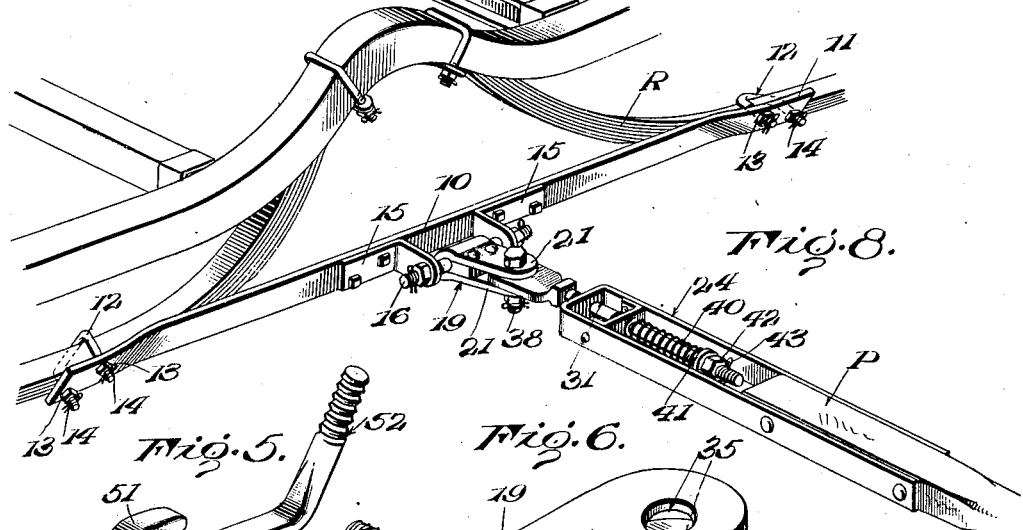
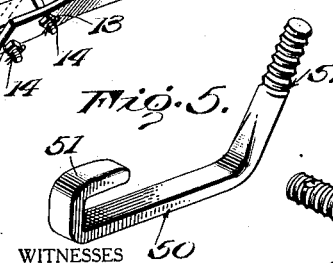
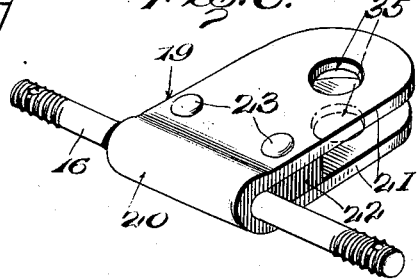
WITNESSES  
INVENTOR  
E. M. Franzen  
BY  
ATTORNEYS Patented Dec. 7, 1926.

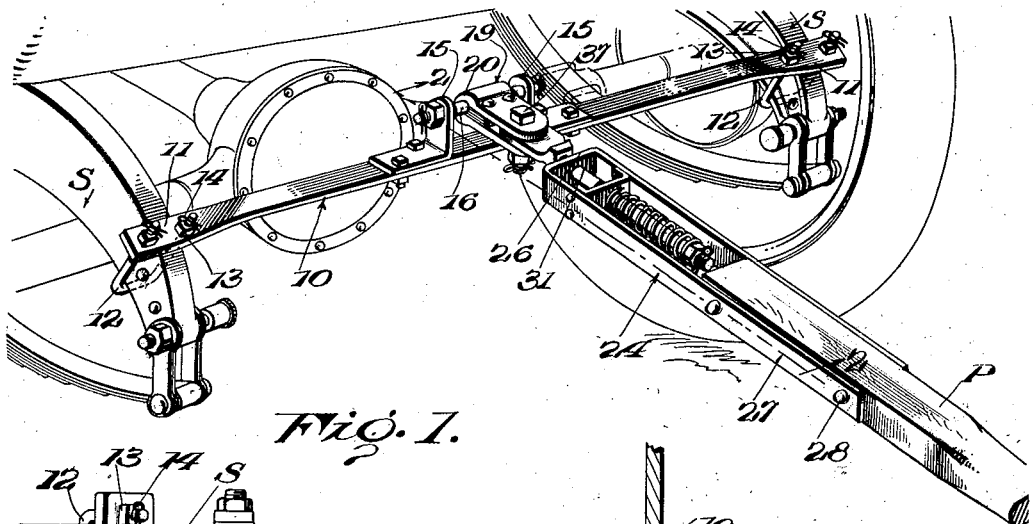

1,610,083

UNITED STATES PATENT OFFICE.

ERIK MAURITES FRANZEN, OF CRESTON, CALIFORNIA.

TRAILER CONNECTION.

Application filed November 29, 1924. Serial No. 752,911.

This invention aims to provide a trailer connection especially designed for use with automobiles and which serves to effectively connect the trailer to the automobile while permitting all necessary relative movement between the parts in going around curves, over irregular or rough ground, or the like.

A further object is the provision of a trailer connection of this character and which is provided with means for taking up the shocks and jars sometimes encountered in actual practice.

A further object is the provision of a trailer connection having the advantages and capacities mentioned and which is also of simple and durable construction, reliable and efficient in operation, and easily and comparatively inexpensive to manufacture and apply.

Another object is the provision of a trailer connection which may be conveniently applied to various types of automobiles in a secure and effective manner.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a perspective view showing a trailer connection embodying the present invention and applied to one type of automobile, Figure 2 is a view in section on the line 2—2 of Figure 1, Figure 3 is a view in section on the line 3—3 of Figure 2, Figure 4 is a fragmentary detail view partly in section and partly in elevation showing the means employed for holding the parts of the connection mounted on the automobile against vibration when the trailer has been disconnected, Figure 5 is a detail perspective view of the holding bolt shown in Figure 4, Figure 6 is a detail perspective view of the pivot plate mounted on the cross bar, Figure 7 is a fragmentary view in elevation showing the invention applied to a different type of automobile, and Figure 8 is a perspective view further illustrating the application shown in Fig. 7.

Referring to the drawings, the numeral 10 designates a frame member designed to be connected to the automobile and which preferably consists of a cross bar extending transversely of the automobile at the rear end of the same. The ends of the cross bar 10 are twisted to provide attaching portions 11.

The attaching portions 11 may be snugly fitted up against the rear end portions of the side bars S of the chassis as shown in Figs. 1 and 2 when the trailer connection is applied to one type of automobile.

These same attaching portions 11 may also be fitted flush up against the opposite end portions of the rear cross spring R when the trailer connection is employed on a different type of automobile.

In either application of the trailer connection U-bolts 12, nuts 13 and cotter pins 14 are employed in conjunction with the attaching portions 11 to secure the cross bar firmly and rigidly to the portions of the vehicle to which it is attached.

In the application of the invention shown in Figs. 1 and 2 the cross bar is disposed in a horizontal plane; whereas, in the application shown in Figs. 7 and 8 the cross bar is disposed in a vertical plane.

A pair of angular bearing lugs 15 are fixedly secured to the cross bar 10 adjacent the center thereof and in these bearing lugs a pivot bolt 16 is rotatably fitted, the pivot bolt being held against axial displacement by means of nuts 17 and cotter pins 18. The pivot bolt 16 is horizontally disposed and extends transversely of the automobile in either application of the invention. A pivot plate, designated generally at 19, is provided and has its central portion 20 welded or otherwise suitably secured to the pivot bolt 16. Beyond the central portion 20 the pivot plate 19 includes a pair of spaced wings 21, the wings 21 being held in spaced relation by a spacing block 22 fitted in between the wings and held in position by bolts and nuts 23.

A U-shaped bracket, designated generally at 24, is provided and has a body portion 26, a pair of legs 27, the legs 27 embracing the pole P of the trailer and being secured thereto by bolts and nuts 28. The body portion 26 of the bracket 24 is provided with a bearing 30 in which a rod 31 is rotatably and slidably fitted. The rod 31 is also rotatably and slidably fitted in the bearing 32 provided in a cross piece 33 extending between and secured to the legs 27 of the bracket inwardly of the body 26. Of course, the bearings 30 and 32 are alined. The outer end of the rod 31 projects beyond the body portion 26 of the bracket 24 and has secured thereto a pivot plate 34 which is fitted in between the wings 21. The wings 21 and the pivot plate 34 are provided with pivot openings, designated at 35 and 36, respectively, and these pivot openings are alined in the assembly. A king bolt 37 is fitted in these alined openings and is held in place by a nut 38 and cotter pin 39.

The inner end of the rod 31 projects inwardly beyond the cross piece 33 and a coil spring 40 encircles the inner end of the rod 31 and abuts the cross piece 33 at one end and a washer 41 at its other end, the washer being held to the rod by a nut 42 and cotter pin 43. The coil spring 40 is tensioned to urge the rod 31 inwardly of the bracket and serves to resiliently resist and limit outward movement of the rod.

When the trailer is disconnected from the parts of the invention applied to the automobile it is desirable to hold the pivot plate 19 against movement, and for this purpose a bolt 50 is provided and is formed with a hook-shaped head 51 designed to engage the cross bar 10. The shank of the bolt 50 is formed with an inclined or offset end 52 which is externally threaded and adapted to be inserted through the pivot openings 35. A nut 53 is threaded on the offset end 52 of the shank and holds the parts in position, as shown in Fig. 4.

With this arrangement the trailer may be readily, easily and properly connected to an automobile irrespective of whether the automobile has longitudinal rear springs or transverse rear springs, the cross bar 10 being adapted for association with either the side bars of the chassis or the end portions of the spring. A strong, durable and positive connection is provided between the automobile and the trailer and yet the trailer is free to partake of the necessary relative movement since the bracket 24 may move pivotally about three axes relative to the cross bar 10. The spring 40 takes up excessive shocks and jars and this spring and the manner of connecting the cross bar to the automobile prevents distortion of any of the parts.

I claim:

1. A trailer connection for use with automobiles and comprising a cross bar designed to be extended transversely of the automobile at the rear thereof, fastening means for securing the ends of the cross bar to portions of the automobile at the opposite sides thereof, a pair of bearing lugs fixed on the cross bar, a pivot bolt rotatably mounted on the bearing lugs, a pivot plate fixed to the pivot bolt and encircling the same and providing a pair of spaced wings, a bracket designed to be fixed to a trailer, a rod mounted for rotary movement and for limited sliding movement on the bracket, said pivot plate and said wings having registering openings, a pivot plate fixed to said rod and a king bolt having its shank slidably and releasably fitted in the registering openings and having a head engaging one of the wings and releasable means connected with the bolt and co-operable with the other wing to prevent accidental displacement of the bolt.

2. A trailer connection for use with automobiles and comprising a cross bar designed to be extended transversely of the automobile at the rear thereof, fastening means for securing the ends of the cross bar to portions of the automobile at the opposite sides thereof, a pair of bearing lugs fixed to the cross bar, a pivot bolt mounted in the bearing lugs, a pivot plate mounted on the pivot bolt and having spaced wings provided with alined pivot openings adapted to co-act with the pivot plate of the trailer and means for holding the wings against movement when the connection is not in use, and comprising a bolt having hook shaped head engaged with the cross bar, and having inclined end extended through the alined openings of the wings, and means co-acting with the bolt for preventing displacement of the wings on the inclined end thereof.

3. A trailer connection for use with automobiles and comprising a cross bar designed to be extended transversely of the automobile at the rear thereof, the cross bar having its body portion disposed in the plane most desirable for effective use and having its ends twisted to snugly and firmly engage the parts of the automobile to which the cross bar is to be secured, fastening means for securing the ends of the cross bar to the portions of the automobile which they slightly engage, and means co-operable with the intermediate portion of the cross bar for affording pivotal connection between the cross bar and the tread.

ERIK MAURITES FRANZEN.